UNITED STATES PATENT OFFICE

BENJAMIN R. HARRIS, OF CHICAGO, ILLINOIS

MARGARINE AND PROCESS FOR PRODUCING THE SAME

No Drawing.  Application filed August 9, 1930. Serial No. 474,308. REISSUED

My invention relates to an improved type of margarine and the process of producing the same. The present application is a continuation in part of my copending application Serial No. 431,964, filed February 27, 1930.

In spite of the improvements in materials and processes for producing margarine, and for the formation of more stable margarine emulsions, even the better grades of margarine have suffered in the past from the separating out of water after the margarine has been produced, this separation being known in the trade as "weeping", or "leaking", or "sweating". This weeping has occurred in the past at all stages in the storage, sale, and use of margarine. This required the use of high grade, relatively expensive moisture retaining packages to prevent leaking of the margarine in shipment. As a consequence also, it has been difficult to ship margarine by parcel post or other similar means. And most objectionably, when margarine is cut or spread, it does not present a dry butter-like appearance, and its texture, due to the separating out of small globules of water, is not of the best. A disadvantage in margarine occasioned by the same tendency is the fact that it has been impossible to regulate, with dependability, the amount of moisture contained in the margarine.

The principal object of my present invention is to improve margarine with respect to the objections above set out.

Another object is to prevent the weeping of margarine.

Another object is to produce a margarine having a definite predetermined moisture content and which will substantially retain the same moisture content during all conditions of manufacture, sale and use thereof.

Another object is to improve the texture of margarine when used as a spread or in other ways.

In connection with the improvements in margarine according to the objects hereinabove set out, I have discovered certain groups of compounds which I characterize as hydrophyllic lipins, which have the capacity in a marked degree when used in relatively small proportions as addition agents of aiding in the retention of moisture in margarine and improving the character of the margarine in other respects. In general these substances may be said to be the higher acyl and alkyl and similar innocuous derivatives of various poly-hydroxy compounds, and may be represented by the general formula

$$(RO)_v X(OH)_w (H)_z$$

wherein "O" and "H" are oxygen and hydrogen respectively "$v$", "$w$" and "$z$" are relatively small whole numbers, "X" represents the carbon skeleton of a polyhydroxy substance with groups (OH) and (RO), wherein "R" is an acyl, alkyl or some other substantially lipophillic group, and wherein the ratio of "$w$" to "$v$" is at least one. Preferably the acyl and alkyl groups contain at least six carbons. I shall now describe more fully the nature of my compounds, the manner of their manufacture and use, and how they differ from other compounds of somewhat similar character.

In my copending application, Serial No. 475,622, filed February 27, 1930, I described a large group of substances having balanced hydrophile and lipophile groups which are of great value in preventing the spattering of margarine during frying, and improving the character thereof in other respects. In general it may be said that these anti-spatterers are lipins to which have been added by synthesis or in other ways, hydrophyllic groups sufficient to impart hydrophyllic tendencies to a portion of the resulting molecule so that the resulting compound comprises "balanced" lipophile and hydrophile groups.

According to the theory established in the copending application referred to, these compounds orientate themselves at the water-oil interface of the emulsion in such a way as to modify the surface tension characteristics or produce other unexplained results which have an effect in markedly reducing the spattering which normally occurs when margarine is heated in an open pan.

The substances of my present invention are similar in many respects to the anti-spattering compounds, but differ essentially in this:

that the hydrophyllic character of the molecule is not sufficiently pronounced to have an anti-spattering effect. These hydrophyllic lipins, incapable of preventing spattering of margarine, can be used in the margarine when suitably introduced and in proper proportions for the purpose of preventing weeping by holding the moisture more securely than is possible without their use. They also permit better control of the margarine to produce a uniform product having a predetermined substantially constant amount of moisture.

Examples of compounds which can be used in accordance with the present invention are mono-stearic acid ester of glycerine (monostearyl glycerol), monopalmitic acid ester of glycerol, monocetyl ether of glycerol, monomyristyl glycerol, monolauryl glycerol, monomyristyl diethylene glycol, monomelissyl diethylene glycol, monopalmityl glycerol, mono-oleyl diethylene glycol, mono-oleyl diglycerol, mono-oleyl glycerol, diethylene glycol mono-stearate, 1,6-dilauryl diglycerol, and their equivalents. I also include in this group alkyl and acyl derivatives of sugars such as dextrose, sucrose, and derivatives of mannitol, sorbitol, poly-glycerols and similar hydroxy compounds which have sufficient of the hydroxy groups esterified or combined with higher molecular weight lipophile groups to make the compound sufficiently oil wetting but insufficiently water wetting to "balance". These substances as indicated in the present invention, therefore, will not produce anti-spattering behavior in margarine when the margarine is subjected to frying.

Of this class just described, there are two sub-classes which contain many important compounds, and to which I wish to direct particular attention. The first sub-class comprises hydrophyllic, higher alkyl and acyl derivatives of poly-hydroxy compounds which contain more than one free OH group, but which will not prevent spattering. More specifically, under this group are the hydrophyllic stearic acid esters of poly-hydroxy compounds containing more than one free OH group. Of this class, the compound with which I have obtained the most satisfactory results in my experimental work, is monostearyl glycerol.

The second sub-class of compounds are the hydrophyllic alkyl and acyl derivatives of glycols. These compounds may have only one free OH group or they may have more than one free OH group, but the number of OH groups should not be sufficient to impart too marked a hydrophyllic character to the molecule. The most important example under this class is monostearyl diethylene glycol, (diethylene glycol monostearate).

As a specific example of the operation of my invention, a good grade of vegetable margarine can be produced in accordance with the following formula: 990 pounds of cocoanut oil (melting point 76° F.), 630 pounds of hardened vegetable oil (melting point 110° F.), 180 pounds of cotton seed oil, 24 pounds of monostearyl glycerol, and 100 gallons of cultured milk. The oleaginous materials and milk are emulsified, crystallized, and treated in any of the usual ways to produce the final margarine product. When using this formula the hydrophyllic lipin viz: monostearyl glycerol may be emulsified directly with the other ingredients in the liquid stage. It may be said however, that in general, certain precautions must be observed in the manner of introducing the hydrophyllic lipin, and these precautions will be treated of hereinafter.

Another formula also making use of a monostearyl glycerol is as follows: 800 pounds of cocoanut oil, (melting point 76° F.), 2.5 pounds of cottonseed oil (melting point 140° F.), 8.5 pounds of monostearyl glycerol, 50 to 55 gallons of cultured milk. In this formula also, the hydrophyllic lipin may be introduced in the emulsion in the liquid stage, or it may be introduced at another stage in the manufacture of this margarine, as will be described.

Margarine containing animal fat may be produced in accordance with the following formula: 640 pounds of oleostearine, 640 pounds of lard, 240 pounds liquid cottonseed oil, 80 pounds of hydrogenated cocoanut oil and approximately 56 gallons of cultured milk. To this is added approximately 1% of monostearyl glycerol, introduced in a suitable manner.

In introducing my hydrophyllic lipins into the margarine I have, as previously indicated, found that certain precautions must be observed. In other words, when the hydrophyllic lipins are used in margarine they may be productive of inferior results or may lead to difficulties in maintaining the proper emulsion unless handled carefully. The margarines described above are habitually prepared with the oleaginous substances in the continuous phase, and the aqueous substances dispersed therein. There seems to be some tendency for the hydrophyllic lipin to modify the phase structure, and so when introducing the hydrophyllic lipin in the liquid stage, it is not advisable to use more than about 1% thereof. However, if the hydrophyllic lipin is introduced after the margarine emulsion has been crystallized and rendered plastic, the amount of this substance can be increased with no injurious results. However, it may be added, the amount used should not be great enough, radically to alter the physical appearance, consistency or texture of the margarine.

As an instance of the behavior of these hydrophyllic lipins in margarine, monostearyl glycerol serves as an example. Proportions of this substance greater than approximately 1% of the total weight of the margarine can be introduced into the margarine in the liquid stage before crystallizing only with extreme caution. If the amount used in this way is much in excess of 1%, the emulsion tends to be destroyed entirely. However, if the monostearyl glycerol is introduced into the margarine by blending it into the plastic mass after crystallization, or by working it in on the butter worker, or by introducing it in some other manner after crystallization, the amount may be considerably in excess of 1% and good results obtained.

As I have previously stated, proportions of hydrophyllic lipin greater than approximately 1% should not be used with the usual types of margarine, but if the lipin is blended into the margarine the proportions may be substantially increased. I have found however, that for most purposes the best percentage is approximately ½% of hydrophyllic lipin based upon the weight of the margarine, and I have found that quantities as low as $\frac{2}{10}$ of 1% have such a marked effect upon the characteristics of the final product that even this small amount can be used with great satisfaction.

It is my theory that the function of the hydrophyllic lipin in margarine is not entirely to increase and stabilize the emulsion but to absorb interstitial moisture or milk which exists between the margarine particles, and to aid the emulsion as a whole to absorb moisture and so to prevent leakiness of the margarine and maintain a drier product. The actual facts are that a margarine produced by the above methods and with the formulæ above set out, will resist leaking of aqueous material during storage and ageing. Furthermore, the cutting and spreading characteristics are better than in the case of margarine made with the ordinary oleaginous materials.

It is not to be supposed that all substances of the general class described are suitable for use in accordance with my invention. For example, there are carboxylic esters of hydroxy substances containing unesterified hydroxy groups which are not sufficiently hydrophyllic to offer any marked advantage over the fats and oils used heretofore. Examples of such compounds are diacyl glycerols, such as, distearyl glycerol, dipalmityl glycerol, monopalmityl-monostearyl glycerol, dioleyl glycerol.

In order that those skilled in the art may practice my invention without difficulty, I wish to disclose the preferred manner in which I have employed my hydrophyllic lipins with the best results. First, any good grade of margarine is produced in a suitable manner and progressed to the stage of blending, which may be carried out in any of the usual blending equipment. The hydrophyllic lipin is added to the margarine on the blender, being prepared for addition to the margarine in the following way. 3 pounds of monostearyl glycerol is emulsified with 4½ pounds of sweet milk or water, the monostearyl glycerol being melted for the purpose of preparing the emulsion. More specifically as to the manufacture of this emulsion, the monostearyl glycerol and milk are both heated to approximately 160° F. and the monostearyl glycerol introduced into a beater having a wire loop whip. The hot milk is then introduced slowly with constant beating, taking about four to five minutes to introduce all of the milk. Beating is then continued while the substances are allowed to cool to a sufficiently low temperature to produce a paste. If care is not taken during the emulsification or if the paste emulsion is cooled too quickly the product may be "sandy". This does not prevent it from being used, but it does impair its effectiveness somewhat.

This paste emulsion after cooling has the consistency of a heavy thick cream, the milk being the continuous phase. If desired it can be further thinned by the addition of milk or water, but in any case a product having the desired consistency suitable to permit its addition to the margarine in the blender, should be employed. This paste emulsion is then introduced into the margarine. The amount of the paste introduced into the margarine in accordance with my preferred practice should be such that the hydrophyllic lipin dispersed therein will be approximately ½% of the final product.

My invention can be practiced with all types of margarine such, for example, as the product known as "puff paste" in the baking industry. This product consists of a relatively high melting point oleaginous material and either water or milk, emulsified therein. (Water is usually employed in the present practice.) It is used in making what is known as "puff pastry" which consists of a number of thin layers of batter separated by the oleaginous paste. In producing the layers they are folded over on themselves repeatedly, each time with a layer of the oleaginous paste separating the layers of batter, and rolled out, the process being continued until a very large number of layers finally results, sometimes 1500 to 1800 layers in an article a portion of an inch in thickness. The function of the puff paste is to act as a lubricant to separate the layers of batter and to hold moisture between the layers so that when the pastry is baked the vaporization of the moisture will puff the layers up and produce a fluffy final product many times the thickness of the original unbaked article.

I have found that by means of my invention moisture is prevented from leaking from the oleaginous portion of the paste, with the result that a better paste product is obtained and very much better results are obtained in the final baked product. I have actually produced considerable puff pastry made with paste employing my invention and have found that the results are better in that sogginess is reduced and a very much lighter pastry is obtained which is the aim sought by the bakers.

As an example of the "puff paste" employing my invention I give the following formula: 630 pounds of oleostearine, 870 pounds liquid cottonseed oil, 45 to 50 gallons of water, and 8½ pounds monostearyl glycerol. The oleaginous materials are emulsified with the water and milk (in the usual manner), stabilized by crystallization in a cold medium, and the monostearyl glycerol introduced in the form of a paste by blending as described above.

The term margarine, as used herein, is meant to include all types of edible or culinary plastic emulsions of oleaginous and aqueous substances. The oleaginous substance used may be of vegetable or animal origin, or mixed, and the aqueous substance may be sweet milk, soured or cultured milk, plain water, brine, or in fact, any edible aqueous medium.

It is obvious that I am not required to restrict my invention to the use of any specific hydrophyllic lipin, or the use thereof with any particular type of margarine. Moreover, the method of preparing the lipin, or the manner of introduction into the margarine may be modified. While many details of the invention are disclosed for the purpose of enabling those skilled in the art to practice the same, the scope of the invention is defined in the appended claims.

What I claim as new and desire to protect by Letters Patent of the United States is:—

1. As a new article of manufacture, margarine comprising oleaginous and aqueous constituents, and having included therein as an addition substance, a relatively small amount of a hydrophyllic lipin in the form of a derivative of a polyhydroxy substance, said hydrophyllic lipin being incapable of reducing spattering in margarine and being represented by the general formula $(RO)_v X(OH)_w(H)_z$ wherein "O" and "H" are oxygen and hydrogen respectively, "$v$", "$w$" and "$z$" are relatively small whole numbers, "X" represents the carbon skeleton of a polyhydroxy substance with groups "(OH)" and "(RO)", wherein "R" is an acyl, alkyl or some other substantially lipophile group with at least six carbon atoms, and wherein the ratio of "$w$" to "$v$" is at least one.

2. As a new article of manufacture, a margarine comprising oleaginous and aqueous constituents and including as an addition substance a relatively small amount of a hydrophyllic lipin incapable of reducing spattering of the margarine, said hydrophyllic lipin being in the form of a relatively high molecular weight aliphatic derivative of a water soluble polyhydroxy substance, the addition substance having more than one unesterified hydroxyl group.

3. As a new article of manufacture, margarine comprising oleaginous and aqueous constituents and including as an addition substance a relatively small amount of a hydrophyllic lipin incapable of reducing spattering of the margarine, said hydrophyllic lipin being in the form of a mono-fatty-acid ester of a water soluble polyhydroxy substance and having more than one unesterified hydroxyl group, in which the acyl group of the esterified fatty acid has at least six carbons.

4. As a new article of manufacture, margarine comprising oleaginous and aqueous constituents and having included therein as an addition substance a relatively small amount of a hydrophyllic lipin incapable of reducing spattering of the margarine, said hydrophyllic lipin being a higher alkyl derivative of a polyhydroxy compound, the final reaction compound having more than one free hydroxyl group.

5. As a new article of manufacture, a margarine comprising oleaginous and aqueous constituents and having included therein as an addition substance a relatively small amount of a hydrophyllic lipin incapable of reducing spattering of the margarine, said hydrophyllic lipin being a stearic acid ester of a polyhydroxy substance, the final reaction compound having more than one free hydroxyl group.

6. As a new article of manufacture, a margarine comprising oleaginous and aqueous constituents and having included therein as an addition substance a relatively small amount of monostearyl glycerol.

7. As a new article of manufacture, a margarine comprising oleaginous and aqueous materials, and having included therein as an addition substance not more than 1% of monostearyl glycerol.

8. As a new article of manufacture, a margarine comprising oleaginous and aqueous constituents and having included therein as an addition substance a relatively small amount of a higher mono-alkyl or higher mono-acyl derivative of a glycol, said derivatives being incapable of reducing spattering of the margarine.

9. As a new article of manufacture, a margarine comprising oleaginous and aqueous constituents and having included therein as an addition substance a relatively small amount of diethylene glycol monostearate.

10. The method of improving margarine having oleaginous and aqueous constituents to prevent leaking of moisture therefrom which comprises introducing into the margarine not more than 1% of a hydrophyllic lipin incapable of reducing spattering of the margarine, said hydrophyllic lipin being represented by the general formula $$(RO)_v X(OH)_w (H)_z$$

wherein "O" and "H" are oxygen and hydrogen respectively, "$v$", "$w$" and "$z$" are relatively small whole numbers, "X" represents the carbon skeleton of a polyhydroxy substance with groups "(OH)" and "(RO)", wherein "R" is an acyl, alkyl or some other substantially lipophile group with at least six carbon atoms, and wherein the ratio of "$w$" to "$v$" is at least one.

11. The method of improving margarine having oleaginous and aqueous constituents to prevent weeping thereof, which comprises first producing a margarine in plastic form, and then introducing into the margarine a chemical compound incapable of reducing spattering and represented by the general formula $(RO)_v X(OH)_w (H)_z$ wherein "O" and "H" are oxygen and hydrogen respectively, "$v$", "$w$" and "$z$" are relatively small whole numbers, "X" represents the carbon skeleton of a polyhydroxy substance with groups "(OH)" and "(RO)", wherein "R" is an acyl, alkyl or some other substantially lipophile group with at least six carbon atoms, and wherein the ratio of "$w$" to "$v$" is at least one.

12. The method of improving margarine having oleaginous and aqueous constituents to prevent weeping thereof, which comprises first producing a margarine in plastic form, forming a paste of a chemical compound incapable of reducing spattering and represented by the general formula $$(RO)_v X(OH)_w (H)_z$$

wherein "O" and "H" are oxygen and hydrogen respectively, "$v$", "$w$" and "$z$" are relatively small whole numbers, "X" represents the carbon skeleton of a polyhydroxy substance with groups "(OH)" and "(RO)", wherein "R" is an acyl, alkyl or some other substantially lipophile group with at least six carbon atoms, and wherein the ratio of "$w$" to "$v$" is at least one, and then blending or kneading the paste into the margarine.

13. As a new article of manufacture, a margarine having oleaginous and aqueous constituents and having included therein not more than one per cent of a hydrophyllic lipin incapable of reducing spattering of the margarine, said hydrophyllic lipin being represented by the general formula $$(RO)_v X(OH)_w (H)_z$$

wherein "O" and "H" are oxygen and hydrogen respectively, "$v$", "$w$" and "$z$" are relatively small whole numbers, "X" represents the carbon skeleton of a polyhydroxy substance with groups "(OH)" and "(RO)", wherein "R" is an acyl, alkyl or some other substantially lipophile group with at least six carbon atoms, and wherein the ratio of "$w$" to "$v$" is at least one.

14. As a new article of manufacture, a plastic margarine-like edible emulsion of semi-solid consistency, having an oleaginous phase and an aqueous phase, and having included therein as an addition substance a relatively small amount of a hydrophyllic lipin in the form of a derivative of a polyhydroxy substance, said hydrophyllic lipin being incapable of reducing spattering in margarine, and being represented by the general formula $(RO)_v X(OH)_w (H)_z$ wherein "O" and "H" are oxygen and hydrogen respectively, "$v$", "$w$" and "$z$" are relatively small whole numbers, "X" represents the carbon skeleton of a polyhydroxy substance with groups "(OH)" and "(RO)", wherein "R" is an acyl, alkyl or some other substantially lipophile group with at least six carbon atoms, and wherein the ratio of "$w$" to "$v$" is at least one.

In witness whereof, I hereunto subscribe my name this 31st day of July, 1930.

BENJAMIN R. HARRIS.